March 31, 1936. R. W. WILMER 2,035,735
CONTAINER
Filed May 9, 1935
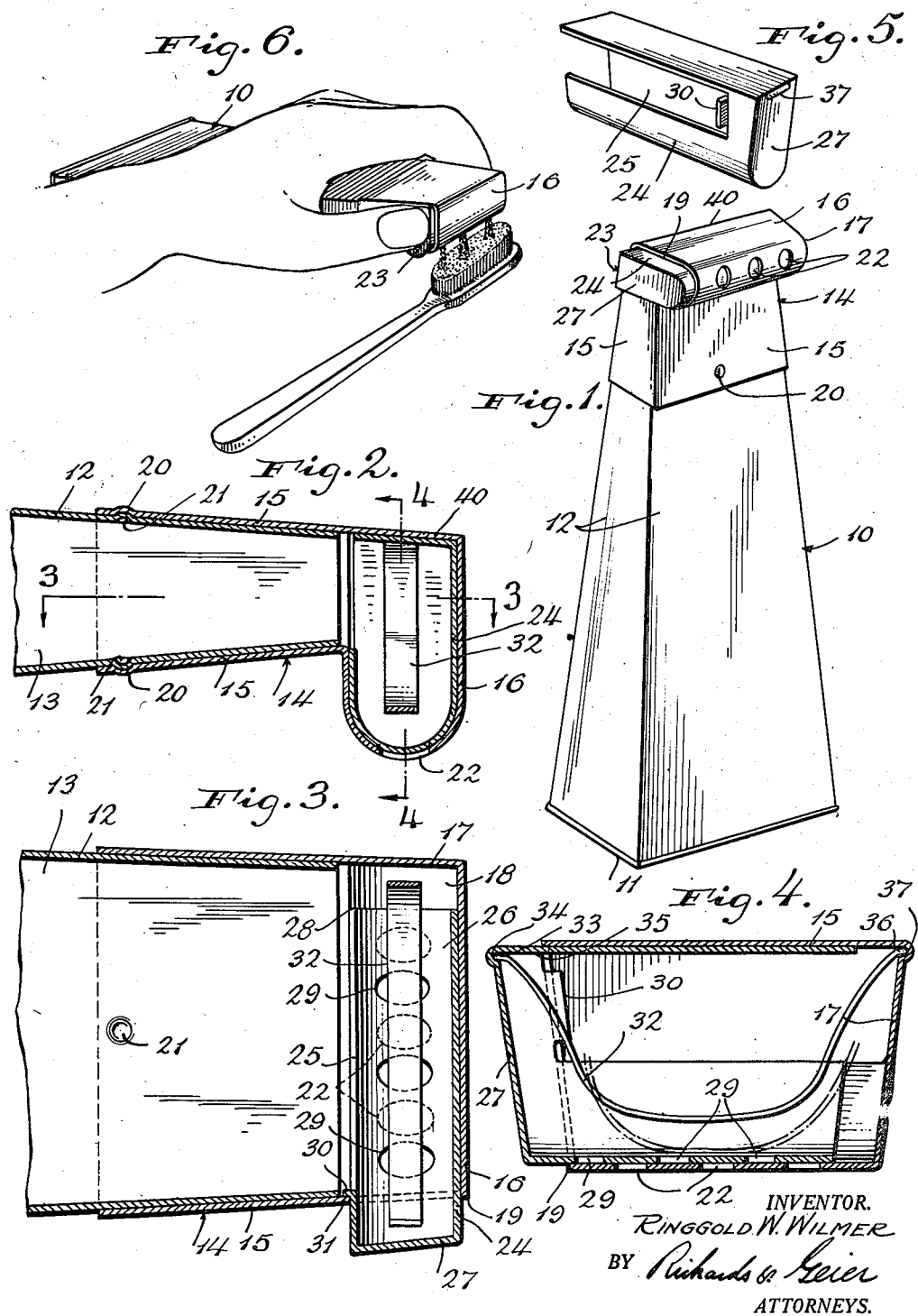
INVENTOR.
RINGGOLD W. WILMER
BY Richards & Geier
ATTORNEYS.

Patented Mar. 31, 1936

2,035,735

UNITED STATES PATENT OFFICE 2,035,735

CONTAINER

Ringgold Wilson Wilmer, Brooklyn, N. Y.

Application May 9, 1935, Serial No. 20,554

2 Claims. (Cl. 221—65)

This invention relates to containers and refers more particularly to containers which may be used for any powdered, granulated, dry flowing or fungible substance and which are provided with means for dispensing this substance.

An object of the present invention is the provision of a container of simple construction provided with a semiautomatic opening and closing device which permits the contents of the container to be removed at will.

Another object is the provision of a combined container and dispensing device which can be held easily and comfortably in one hand and the entire manipulation of which requires the use of one hand only.

A further object is the provision of a container having a form which assures the greatest possible stability of said container and which at the same time provides an easy and comfortable grip for the hand which holds the container, said container being provided with dispensing means capable of being operated by the same hand.

The above and other objects of the present invention may be realized through the provision of a container comprising a lower hollow body portion which is preferably tapered in shape, an upper dispensing device having an outer chamber which forms a continuation of the hollow interior of the container, and an inner chamber which is movable relatively to the outer chamber and the walls of which are provided with openings or perforations adapted to coincide with similar openings formed in the walls of said outer chamber. Suitable means are provided for maintaining the two sets of openings out of registry with each other while the container is closed.

The invention will appear more clearly from the following detailed description when taken in connection with the accompanying drawing illustrating by way of example only, a preferred embodiment of the inventive idea.

In the drawing:

Figure 1 shows in perspective a container constructed in accordance with the principles of the present invention.

Figure 2 is a vertical section through the upper part of the container.

Figure 3 is a section along the line 3—3 of Figure 2.

Figure 4 is a section along the line 4—4 of Figure 2.

Figure 5 is a perspective view of the device constituting the inner movable chamber of the container.

Figure 6 is a perspective view illustrating the mode of operating the dispensing device.

The container illustrated in the drawing comprises a body portion 10 having a comparatively wide bottom 11 and converging side walls 12. Due to the tapered construction of the body portion 10, the container is larger at the base than at the top and has a lower center of gravity which lessens the danger that it may be accidentally tipped over. Obviously, the body portions of any other suitable form and shape may be employed.

The botom 11 and the side walls 12 form an inner lower chamber 13 which may be filled with any suitable powdered, granulated or fungible substance, such as tooth powder.

The body portion 10 carries a separate closing and dispensing member 14 having diverging walls 15 which fit over the adjacent portions of the tapered walls 12. Obviously, the dispensing member 14 and the container body 10 may be made of a single piece.

The dispensing member 14 comprises a curved U-shaped top and side wall 16, and side walls 17 and 40 which form a continuation of two of the slanting walls 15. The walls 16, 17 and 40 form a chamber 18 which is in communication with the chamber 13.

When the dispensing member 14 is not used, the container body may be closed at its upper end by any suitable closure made of cork, metal, transparent cellulose or the like, which is not shown in the drawing.

The dispensing member 14 is open at one of its ends. This opening is formed by the edges 19 of the top wall 16 and by the adjacent edge of the wall 40.

Two diverging walls 15 of the dispensing member 14 which are situated opposite each other, are provided close to their lower edges with suitable indentations 20 which are adapted to engage similar indentations 21 formed in the corresponding walls 12 of the container body 10.

When the dispensing member 14 is placed over the container body 10, the indentations 20 of the walls 15 engage the projecting portions of the similarly placed indentations 21 of the tapered walls 12. Due to this arrangement the dispensing member 14 is firmly and securely attached to the container body 10. Slight pressure of the thumb and forefinger against the front and rear side walls 12 of the container body 10 immediately below these indentations, will disengage them and release the dispensing member 14.

The curved portion of the U-shaped top wall 16 is provided with openings 22 which are used for dispensing the contents of the body portion 10.

An inner container or member 23 is slidably and movably mounted within the chamber 18. The container 23 comprises a U-shaped top and side wall 24 which fits within the U-shaped top wall 16. The portion 25 of the U-shaped wall 24 is cut out, as illustrated in Figure 3, so that the interior 26 of the slidable member 23 is always in communication with the interior 13 of the container body 10.

As shown in Figures 1 and 3 of the drawing, one side of the slidable member 23 is closed by the side wall 27, while its opposite side is open. The open side of the slidable member 23 is flanked by the edges 28 of the wall 24 (Fig. 3).

As shown in Figure 1, when the device is assembled, the side wall 27 is located adjacent to the open edges 19 of the dispensing member 14. Due to this arrangement, the slidable member 23 forms a suitable closure for the dispensing member 14.

The curved wall 24 of the slidable member 23 is provided with openings or perforations 29 which are similar in form to the openings 22 and which are adapted to coincide with these openings in certain positions of the slidable member 23.

The member 23 may slide in and out of the dispensing member 14 to the extent of the width of its openings or to a slightly greater extent measured in the direction of the movement of the member 23. The openings 22 and the corresponding openings 29 are spaced apart sufficiently to provide a complete closure when the member 23 is in its extended or normal position shown in Fig. 1, thus providing an effective closure.

The wall 24 is provided with a small lug or stop 30 which is illustrated in Figure 3 of the drawing and which engages an edge 31 of the adjacent tapered wall 15, thereby preventing the member 23 from sliding beyond the position shown in Figure 1 and from falling out of the dispensing member 14.

The sliding movements of the member 23 may be caused by a flat spring 32 which is adapted to maintain the sliding member 23 in the closed position shown in Figure 1. As shown in Figure 4, the spring 32 is preferably bent in the form of a bow and comprises an end portion 33 which fits into a groove or recess 34 provided at the edge formed between the side wall 27 and the side wall 35 of the sliding member 23.

The opposite end 36 of the spring 32 is situated in a groove or recess 37 formed at the edge constituted by the side wall 17 and the wall 40 of the dispensing member 14. As a further aid to the purpose of maintaining the spring in its proper position, the side walls 17 and 27 slope slightly toward the perforated portions of the dispensing member 14 and the sliding member 23.

Figure 6 illustrates a mode of operating the container. As shown in that figure, the person using the container holds it in one hand and presses with the thumb against the side wall 27 of the slidable member 23. Due to this pressure, the member 23 moves inwardly in a direction toward the wall 17, thereby compressing the spring 32. In the course of this movement, the openings 29 of the sliding member 23 come in registry with the openings 22 of the dispensing member 14. By reciprocating the member 23 within the dispensing member 14 any desired amount of the granulated substance located within the chamber 13 of the container body 10 may be expelled from the container, as illustrated in figure 6.

As shown in Figure 6, the container is tipped prior to the removal of the granulated substance, so that a portion of the contents of the chamber 13 is poured into the chamber 26.

As soon as the pressure of the thumb upon the wall 27 is released, the spring 32 moves from its compressed position shown by broken lines in Figure 4 to its normal position shown by full lines in the same figure, thereby moving the openings 29 out of registry with the openings 22 and closing the container.

Due to the bowing action of the spring 32 in the course of its compression, a part of the granulated substance is pressed out of the container through the openings by the spring itself. Furthermore, when the pressure of the thumb and forefinger is exerted sharply against the side walls 27 and 17, a bellows-like action takes place by means of which the air within the container is compressed tending to eject, through the openings, the granulated substance situated within the chamber 26.

For certain products, such as a tooth powder, the position of the sliding member 23, in relation to the container body 10, is particularly advantageous as it permits both the tooth brush and the container to be held in an easy normal position while the powder is being deposited directly on the brush.

It will be noted that some departure from the illustrated arrangement of the slide member 23 may be made without seriously affecting the ease with which the container may be utilized.

The container illustrated in the drawing is shown by way of example only and various changes, improvements and modifications may be made therein within the scope of the appended claims.

What is claimed is:

1. A container, comprising a hollow body portion adapted to contain a substance and having comparatively wide front and rear walls which converge relatively to each other from the bottom of the body portion toward the top thereof, and comparatively narrow side walls interconnecting said front and rear walls, the width of said front and rear walls enabling the user to hold the top part of said body portion in the palm of one hand; a hollow dispensing member having four diverging walls fitting over the top portions of the front, rear and side walls of said body portion respectively, and a U-shaped wall having a straight portion constituting the top of the container and joining that diverging wall which fits over the top portion of the rear wall of said body portion, another shorter straight portion extending substantially parallel to and below the first-mentioned straight portion and joining that diverging wall which fits over the top portion of the front wall of said body portion, and a curved portion interconnecting said straight portions; the interior of said hollow dispensing member being in communication with the interior of said hollow body portion, the curved portion of the U-shaped wall of said dispensing member having an opening formed therein, said dispensing member having an open side limited by a U-shaped edge of said U-shaped wall and an adjacent edge of that diverging wall which fits over the top portion of one of the side walls of said body portion, the opposite side of said dispensing member being closed by that diverging wall which fits over the top portion of the other one of the side walls of said body portion; a slidable member which is situated within the U-shaped wall of said dispensing member and which comprises a side wall closing said open side of the dispensing member, the last-mentioned side wall being adapted to be engaged by the thumb of the hand holding the top part of said body portion, said slidable member having an opening which is adapted to coincide with the opening formed in said dispensing member; and means for automatically moving said openings out of registry with each other, whereby the opening formed in said dispensing member is closed by said slidable member.

2. A container, comprising a hollow body portion adapted to contain a substance and having comparatively wide front and rear walls which converge relatively to each other from the bottom of the body portion toward the top thereof, and comparatively narrow side walls interconnecting said front and rear walls, the width of said front and rear walls enabling the user to hold the top part of said body portion in the palm of one hand; a hollow dispensing member having four diverging walls fitting over the top portions of the front, rear and side walls of said body portion respectively, and a U-shaped wall having a straight portion constituting the top of the container and joining that diverging wall which fits over the top portion of the rear wall of said body portion, another shorter straight portion extending substantially parallel to and below the first-mentioned straight portion and joining that diverging wall which fits over the top portion of the front wall of said body portion, and a curved portion interconnecting said straight portions; the interior of said hollow dispensing member being in communication with the interior of said hollow body portion, the curved portion of the U-shaped wall of said dispensing member having an opening formed therein, said dispensing member having an open side limited by a U-shaped edge of said U-shaped wall and an adjacent edge of that diverging wall which fits over the top portion of one of the side walls of said body portion, the opposite side of said dispensing member being closed by that diverging wall which fits over the top portion of the other one of the side walls of said body portion; a slidable member which is situated within the U-shaped wall of said dispensing member and which comprises a side wall closing said open side of the dispensing member, the last-mentioned side wall being adapted to be engaged by the thumb of the hand holding the top part of said body portion, said slidable member having an opening which is adapted to coincide with the opening formed in said dispensing member, and a bow-shaped spring situated within said slidable member and having one end which presses against a corner formed by two diverging walls of said dispensing member and another end which presses against a corner formed by the side wall of said slidable member and an adjacent wall of said slidable member, the curved portion of said bow-shaped spring extending adjacent the openings formed in said slidable member and said dispensing member, said ends of the bow-shaped spring extending in directions away from said openings.

RINGGOLD WILSON WILMER.